(12) United States Patent
Osborne, Jr. et al.

(10) Patent No.: US 12,189,365 B2
(45) Date of Patent: Jan. 7, 2025

(54) METHOD AND SYSTEM FOR VALIDATING EXECUTION OF A PLANNED AGRICULTURAL OPERATION

(71) Applicant: FARMERS EDGE INC., Winnipeg (CA)

(72) Inventors: Ronald W. Osborne, Jr., Winnipeg (CA); Antoine Kandera, Winnipeg (CA)

(73) Assignee: Farmer's Edge Inc., Winnipeg (CA)

( * ) Notice: Subject to any disclaimer, the term of this patent is extended or adjusted under 35 U.S.C. 154(b) by 244 days.

(21) Appl. No.: 17/705,785

(22) Filed: Mar. 28, 2022

(65) Prior Publication Data

US 2022/0350307 A1 Nov. 3, 2022

Related U.S. Application Data

(60) Provisional application No. 63/182,247, filed on Apr. 30, 2021.

(51) Int. Cl.
*G05B 99/00* (2006.01)
*G05B 19/4155* (2006.01)

(52) U.S. Cl.
CPC ............... *G05B 19/4155* (2013.01); *G05B 2219/45017* (2013.01)

(58) Field of Classification Search
CPC ........................................... G05B 2219/45017
See application file for complete search history.

(56) References Cited

U.S. PATENT DOCUMENTS

| | | | |
|---|---|---|---|
| 2017/0344922 A1* | 11/2017 | Sauder | G06F 3/0488 |
| 2020/0134485 A1* | 4/2020 | Sood | A01B 79/005 |
| 2020/0272971 A1* | 8/2020 | Ruff | G06Q 10/06375 |
| 2020/0319649 A1* | 10/2020 | Unesaki | A01B 69/008 |

FOREIGN PATENT DOCUMENTS

CN 109615107 A * 4/2019 ............. G06Q 10/04

* cited by examiner

*Primary Examiner* — Suresh Suryawanshi
(74) *Attorney, Agent, or Firm* — Ryan W. Dupuis; Michael R. Williams; Ade & Company Inc.

(57) ABSTRACT

An agricultural operations validation system works with a task controller of an agricultural machine that communicates operating instructions over a bus to operating elements of the machine to execute agricultural operations. A controller of the system includes a system processor executing programming instructions to (i) receive an operating file defining the operating instructions from an external device, (ii) communicate with the task controller to transfer the operating instructions, (iii) acquire performance information related to execution of the operating instructions, and (iv) compare the performance information to the operating instructions.

24 Claims, 2 Drawing Sheets

METHOD AND SYSTEM FOR VALIDATING EXECUTION OF A PLANNED AGRICULTURAL OPERATION

This application claims the benefit under 35 U.S.C. 119(e) of U.S. provisional application Ser. No. 63/182,247, filed Apr. 30, 2021.

FIELD OF THE INVENTION

The present invention relates to a system and method of use for validating the use of a set of operating instructions by an agricultural machine to execute one or more agricultural operations, and more particularly the present invention relates to a system and method for quantifying that the agricultural machine has followed a prescribed set of operating instructions, and for tracing and recording the transfer of operating instructions onto the agricultural machine and subsequent performance information acquired from the agricultural machine relating to execution of the set of operating instructions by the agricultural machine to perform the one or more agricultural operations.

BACKGROUND

Agricultural machinery transmit certain data across canbus networks. Common data includes rates measured in value per time, value per area, numerical ranges, and other quantitative values. While these values may be transmitted across canbus networks, it is not common for certain other data sets to be transmitted across canbus networks. Values such as the name of a given seeding variety, the name of a specific chemical, the genetic markers of a given seed, or the chemical formula are not found on a canbus.

As businesses and consumers are expecting more information related to the food that they consume, there is an increasing need to track and trace back a given food product or ingredient to its place of origin, and specifically, the details related to what specific farming tasks, machines, rates, chemicals, fertilizers, biological treatments, crop types, and seeding varieties that were used at the place of origin.

As canbus data does not commonly include all information related to rates, chemicals, fertilizers, biological treatments, crop types, seeding varieties and other important data for food traceability, sustainability and carbon monitoring, new methods are required.

SUMMARY OF THE INVENTION

According to one aspect of the invention there is provided an agricultural operations validation system for use with one or more agricultural machines having a task controller in communication with a plurality of operating elements over one or more communication buses of the agricultural machine for controlling operation of the operating elements according to a set of operating instructions to execute one or more agricultural operations with the one or more agricultural machines, the system comprising:
  a system controller including a system processor and a memory storing programming instructions thereon that are arranged to be executed by the system processor whereby the system controller is configured to:
    receive an operating file from an external device in which the operating file defines said set of operating instructions for the one or more agricultural machines;
    communicate with the task controller of the one or more agricultural machines so as to transfer the set of operating instructions of the operating file to the task controller of the one or more agricultural machines;
    acquire performance information related to execution of the set of operating instructions by the one or more agricultural machines; and
    compare the performance information to the set of operating instructions defined in the operating file to determine if the performance information corresponds to any of the operating instructions of the operating file.

According to a second aspect of the present invention there is provided a method of validating an agricultural operation has been executed according to a set of operating instructions, the method comprising:
  providing an agricultural machine having a task controller in communication with a plurality of operating elements over one or more communication buses of the agricultural machine for controlling operation of the operating elements according to a set of operating instructions to execute the agricultural operation with the agricultural machine;
  using a validation system controller to transfer an operating file from an external device to the task controller of the agricultural machine, in which the operation file defines said set of operating instructions for the agricultural machine;
  using the validation system controller to acquire performance information related to execution of the set of operating instructions by the agricultural machine; and
  comparing the performance information to the set of operating instructions defined in the operating file to determine if the performance information corresponds to any of the operating instructions of the operating file.

The present invention as described herein provides a method of determining if a machine has followed a set of operating instructions, and that said operating instructions have taken place on a specific farm field. The method of determination includes a unique identifier for a file containing the prescribed operating events ("operating file of instructions"), a unique identifier that is associated with the operating instructions file containing the desired operating events and includes transmitting the file and the associated unique identifier to a relay device that is connected to one or more communication networks on a machine. Once received by the relay device, the device can send an electronic message to the transmitter of the file and unique identifier that the relay device has received the file and for reporting.

The system controller may be further configured to generate at least one score quantifying the comparison of the performance information to the set of operating instructions defined in the operating file to determine if the performance information corresponds to the operating file.

The system controller may generate a reporting file that includes a unique identification associated with the operating file, a system identification associated with the system controller, a machine identification associated with the agricultural machine, and said at least one score.

The system controller preferably stores the reporting file on the system controller for subsequent transfer to an external apparatus, and/or reports the reporting file to a remote server over a communications network.

The system controller may further comprise a confidence processor arranged to (i) obtain performance information relating to the set of operating instructions follows by the task controller, (ii) compare the set of operating instructions followed by the task controller to the set of operating instructions of the operating file, and (iii) quantify a confidence score representative of a similarity between the set of operating instructions implemented by the agricultural machine under direction of the task controller and the set of operating instructions of the operating file.

The system controller may further comprise a quality processor arranged to (i) obtain performance information relating to operating conditions of the operating elements of the agricultural machine obtained from machine sensors in communication with the communication bus of the agricultural machine, (ii) compare the operating conditions to prescribed conditions dictated by the set of operating instructions of the operating file, and (iii) quantify a quality score representative of a similarity between the operating conditions and the prescribed conditions dictated by the set of operating instructions of the operating file.

The system controller may further comprise an operation data processor arranged to receive sensor data from operating condition sensors of the agricultural machine from the communication bus of the agricultural machine and convert the sensor data into a human readable data set stored on the system controller.

The system controller may further comprise a chain of custody processor arranged to record: (i) a unique identification associated with the operating file, (ii) confirmation of a transfer of the operating file onto the system controller, (iii) a system identification associated with the system controller, and (iv) a machine identification associated with the agricultural machine.

The chain of custody processor of the system controller may be further configured to record GPS information and a time and date associated with the transfer of the operating file onto the system controller and/or record GPS information and a time and date associated with the transfer of the operating file onto the agricultural machine. The performance information acquired by the system controller may include (i) GPS information related to execution of the set of operating instructions by the agricultural machine, (ii) time and date information related to execution of the set of operating instructions by the agricultural machine, and/or (iii) weather information related to execution of the set of operating instructions by the agricultural machine. The weather information may include (i) weather data acquired from a weather system of the agricultural machine and/or (ii) weather data acquired over a wireless communication network from a remote weather system.

The system controller may comprise a portable relay device that is readily separable from the agricultural machine, in which the portable relay device may include (i) a transceiver arranged to receive the operating file from said external device over a wireless communications network, (ii) a unique system identification stored on the system controller together with the operating file that unique identifies the portable relay device, and/or (iii) an integral GPS device arranged to acquire GPS information related to a position of the portable relay device.

When the agricultural machine includes machine sensors arranged to sense operating conditions of the operating elements of the agricultural machine, the system controller may be further arranged to communicate with the machine sensors through a communication channel independent of a communication channel between the system controller and the task controller.

The operating file on the system controller may include task controller instructions arranged to instruct the task controller to acquire sensed operating conditions of the operating elements of the agricultural machine from machine sensors of the agricultural machine. In this instance, the system controller may be arranged to acquire and record said sensed operating conditions from the task controller.

The operating file on the system controller may include task controller instructions arranged to prompt a user of the agricultural machine for supplementary data related to the one or more agricultural operations. In this instance, the system controller may be further configured to store the supplementary data input by the user of the agricultural machine onto the system controller in association with the operating file.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
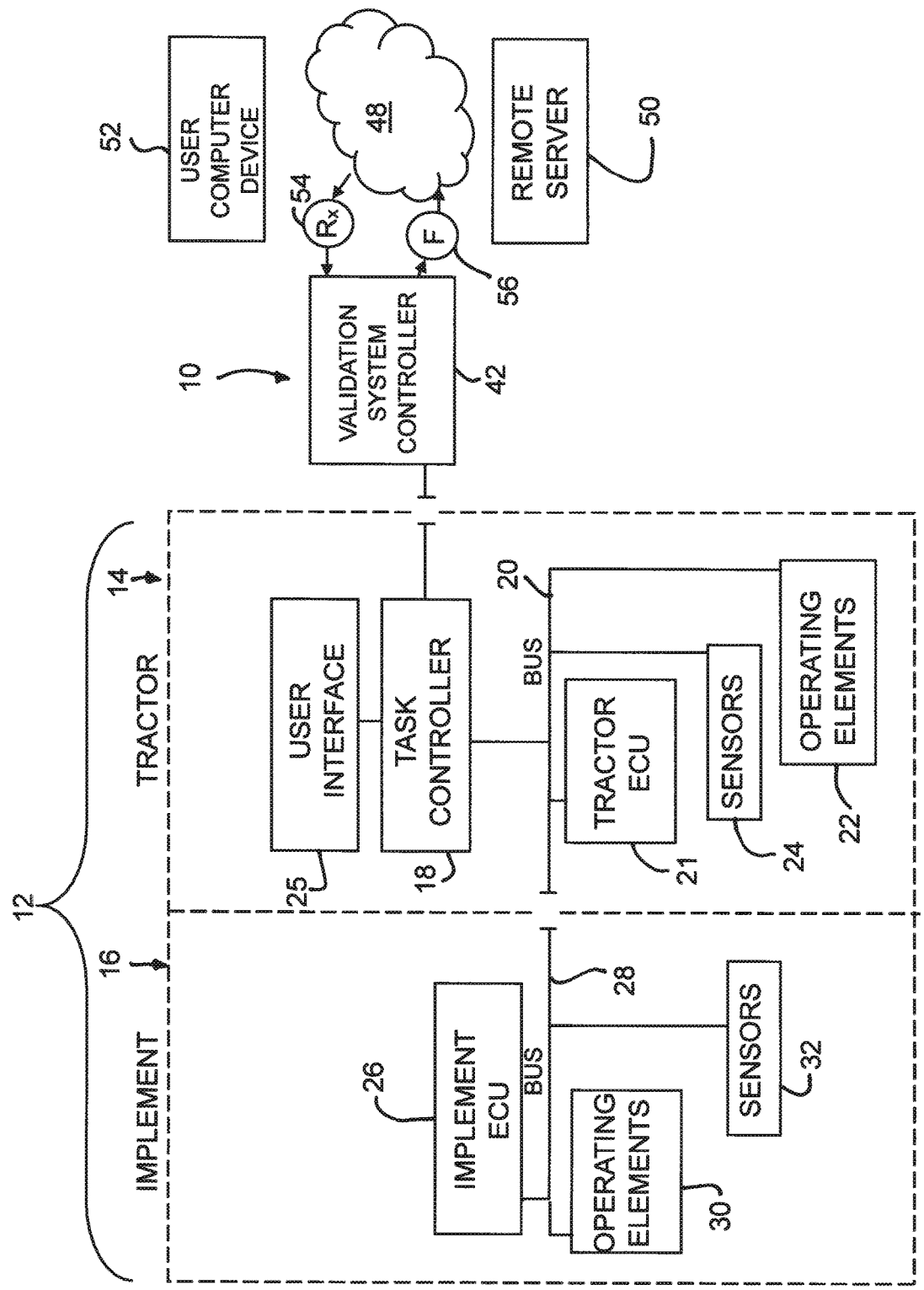
FIG. 1 is a schematic representation of an exemplary agricultural machine upon which the agricultural operations validation system according to the present invention has been applied.
Figure 2:
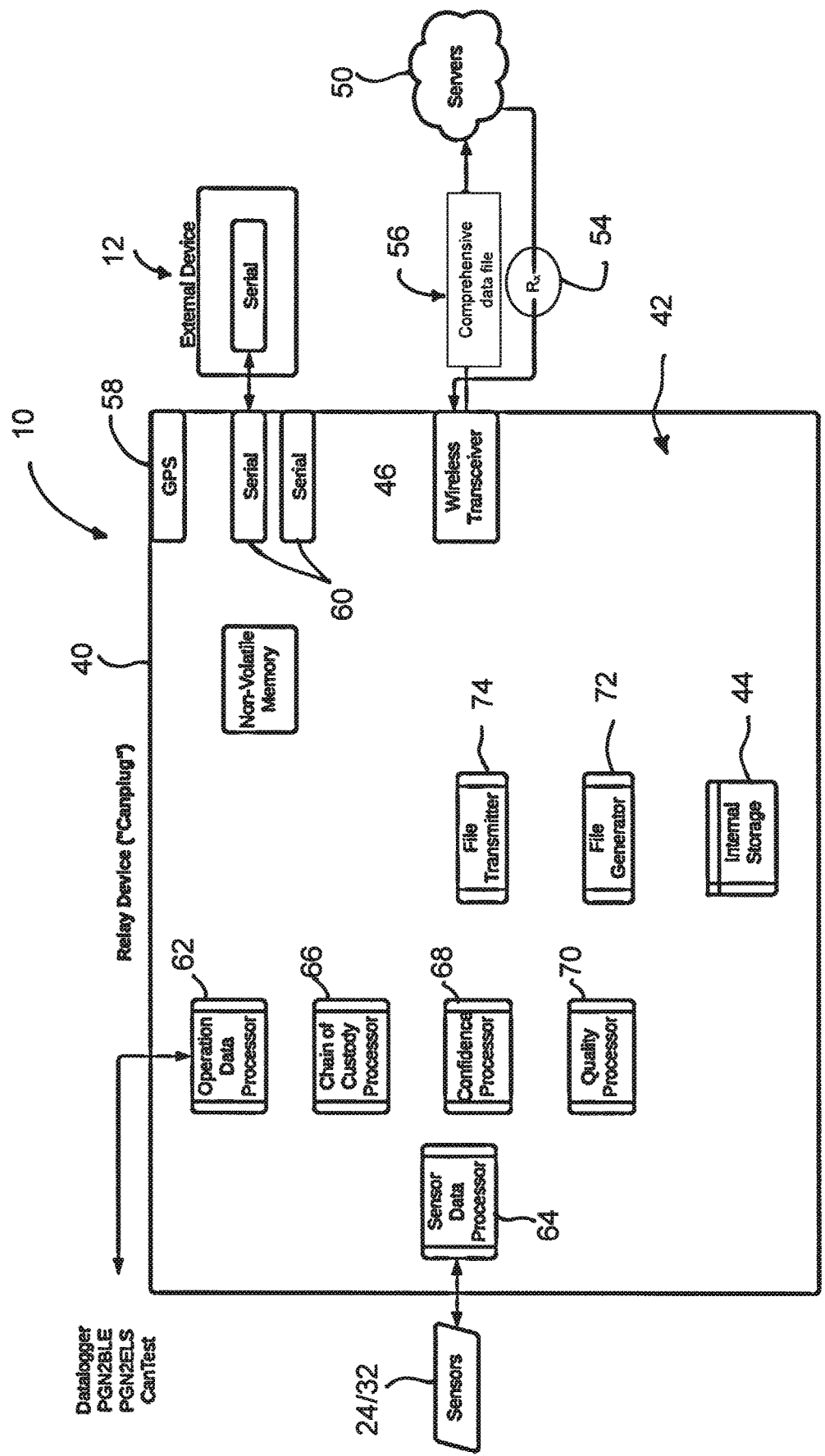
FIG. 2 is a schematic representation of a preferred embodiment of the agricultural operations validation system according to FIG. 1.

Referring to the accompanying figures there is illustrated an agricultural operations validation system generally indicated by reference numeral 10. The system 10 is particularly suited for use with an agricultural machine 12 of the type used for performing one or more agricultural operations on an agricultural field, for example seeding, fertilizing or applying a treatment such as a chemical pesticide and the like to the field.

In the illustrated embodiment, the agricultural machine 12 comprises the collective arrangement of an agricultural tractor 14 towing an agricultural implement 16, for example a sprayer or seeding equipment and the like. The tractor includes a mobile implement control system (MICS) also referred to herein as a task controller 18 in the form of a computer device having a memory storing program instructions thereon and a processor arrangement for executing the program instructions to perform the various functions described herein. The task controller 18 communicates over one or more tractor communication buses 20 with (i) an electronic control unit 21 of the tractor, (ii) a plurality of operating elements 22 that can be operated or actuated to control various operations of the tractor, and (iii) various sensors 24 arranged to sense and record various operating conditions of the tractor. The tractor communication bus 20 shown in the figures is intended to represent one or more communication buses which may be present on the agricultural machine. Likewise, the implement communication bus 28 shown in the figures is intended to represent one or more communication buses which may be present on the implement. Examples of the various sensor systems of the tractor include a GPS device for communicating with GPS satellites to acquire location data, a weather device capable of sensing or acquiring data relating to the current weather, and condition sensors for sensing various operational conditions of the tractor. The tractor typically also includes a user interface 25 which is capable of outputting data to the user for example through a display monitor and receiving data input by the user through various user controls and data input devices associated with the user interface.

The implement 16 in the illustrated example similarly comprises an electronic control unit 26 in communication over one or more communication buses 28 of the implement with (i) a plurality of operating elements 30 that are capable of being operated or actuated to control the operating condition of the implement and (ii) a plurality of sensors 32 that are arranged to sense and record various operating conditions of the implement. For example, when the operating elements comprise sprayer nozzles, the sensors may be capable of monitoring whether a nozzle is in an open or closed state as well as the flow rate of fluid dispensed through the nozzle.

The communication buses 20 of the tractor and the communication buses 28 of the implement communicate with one another and collectively define an overall communication bus of the agricultural machine 12 described herein. Similarly, the operating elements of the tractor and the implement collectively define the overall operating elements of the agricultural machine 12 described herein. Further examples of operating elements of the machine include a rate controller (RC) and a section controller (SC) further referenced below. Furthermore, the sensors 24 of the tractor and the sensors 32 of the implement collectively define machine sensors of the overall agricultural machine 12 as described herein.

The task controller 18 may be represented by a single computer device or may be represented by the collective functionality of a plurality of separate devices in communication with one another. The typical function of the task controller 18 is to receive an agricultural prescription 54 in the form of a set of operating instructions used by the task controller to instruct the various operating elements of the tractor and/or the implement to execute one or more agricultural operations on a field. In a typical set of operating instructions, the agricultural field is recognized as being divided into a plurality of agricultural zones represented as polygons on a location map with respective location coordinates associated therewith and in which specific operating instructions are provided for the various operating elements according to the different zones traversed by the agricultural equipment.

When using the agricultural machine 12 to execute an agricultural operation, various performance information is available on the communication buses of the machine which is in turn available to the task controller and which relates to the execution of the set of operating instructions by the agricultural machines to perform the agricultural operation. Such performance information is related to the execution of the operating instructions by the agricultural machines and can include (i) the specific set of instructions received by the task controller and intended to be executed to perform the planned agricultural operation, (ii) various sensed operating conditions of the tractor and the implement including application rates for example, (iii) weather data acquired either from weather sensors on the agricultural machine or weather data communicated to the machine from a remote sensor through a wireless communication network, (iv) location data acquired from GPS sensors of the agricultural machine that are either incorporated integrally into the machine or which is communicated to the machine from an accessory device or which is acquired from the system 10 when enabled with GPS sensing, and/or (v) time and date when specific operating instructions are executed during an agricultural operation.

According to the illustrated embodiment, the system 10 comprises a portable relay device 40 that defines a computer device within its own housing and which is arranged to be connected to the control systems of the tractor to communicate with the task controller 18, while being readily separable from the control system to allow the device 40 to be connected to different agricultural machines in an interchangeable manner. The system 10 defines a validation system controller 42 comprising a memory 44 and a computer processor arrange to execute the program instructions to perform the various functions of the system described herein.

In further embodiments, the validation system controller 42 may be incorporated into existing hardware of the agricultural machine such that the task controller 18 of the tractor and the validation system controller 42 comprise distinct functional components within a common computer device residing on the tractor. In either instance, the validation system controller 42 can communicate with the communication buses 20 and communication buses 28 of the agricultural machine for communicating operating instructions and acquiring various performance information as described herein.

In yet a further arrangement, when the validation system controller 42 is provided on a portable relay device 40 separate from the agricultural machine 12, the portable relay device may further include the functionality of the task controller 18 incorporated therein such that the functionality of the validation system controller 42 and the task controller 18 again reside on a common computer device but with the device in this instance being separable from the agricultural machine.

In all embodiments, the device 40 supporting the functionality of the validation system controller 42 thereon includes a wireless transceiver 46 providing two-way wireless communication with an external device. For example, the device may communicate over a wireless communications network with a remote server 50 to acquire operating instructions for the agricultural machine transmitted wirelessly over the network. Alternatively, a user computer device 52 such as a tablet or personal computer may communicate with the remote server over the network to acquire various operating instructions for subsequent communication wirelessly to the validation system controller 42 through a local wireless connection. The wireless transceiver 46 may also allow communication of the validation system controller 42 with various sensors 32 or 24 of the agricultural implement by direct wireless communication through a separate communication channel from the connection channel between the task controller and the validation system controller.

In all instances of the present invention, the validation system controller 42 is arranged to receive an operating file of instructions (OFI) 54 as an initial input and is subsequently arranged to generate a reporting file 56 to be reported back to the remote server 50 over the communications network during or subsequent to completion of the agricultural operation. The operating file 54 defines the set of operating instructions corresponding to a planned agricultural operation which are collectively forwarded to the task controller 18 of the agricultural machine to be executed by the agricultural machine in performing the agricultural operation.

The portable relay device 40 according to the illustrated embodiment also includes an integral GPS apparatus 58 in communication with the validation system controller 42 and within the housing of the device for communication with GPS satellites to acquire location data corresponding to the location of the portable device. This can be used to provide location data which is redundant of the location data provided by the agricultural machine for validation purposes or to provide location data when the portable relay device is separate from the agricultural machine.

The device 40 further includes a plurality of serial ports 60 integrated into the housing of the device and in communication with the validation system controller for connection to various external devices. In the illustrated embodiment, one of the serial ports 60 is used to form a serial port connection with a corresponding serial port associated with the control systems of the agricultural machine to allow communication between the validation system controller 42 and the task controller 18. The serial ports further allow connection of a portable computer device 52, for example, as a means of accepting transfer of the operating file from a connected device onto the validation system controller 42 through the serial port connection.

The validation system controller 42 includes an operation data processor 62 comprising a program that receives sensor data generated from operating condition sensors of the agricultural machine from one or more communication buses of the agricultural machine and converts the raw sensor data into human readable datasets stored on the system controller. The system controller 42 further includes a sensor data processor 64 to enable communication of the system controller with the sensors 24 and 32 of the agricultural implement.

A chain of custody processor 66 of the system is a program which tracks the checksums/UUID/Hash of the file from the cloud to the device, to the memory storage partitions of the system, to the serial ports, and to the control systems of the agricultural machine including the task controller 18 thereof. The chain of custody processor 66 is further able to acquire location data from one or more GPS systems, time and date information from externally connected devices or any other information that can be detected from the file system mounting to move the file. This processor may further be configured to determine if the system is connected to a type of agricultural machine that was originally instructed by the operating file 54, for example by checking identity information associated with electronic control units of the agricultural machine, and to determine if the task controller on the communication bus that is connected is capable of running the operating instructions provided by checking the associated electronic control unit and/or unique identifying information associated therewith.

The chain of custody processor 66 is thus arranged to record a unique identification associated with the operating file 54, a confirmation of the transfer of the operating file onto the system controller 42, a system identification associated with the system controller, a confirmation of the transfer of the operating file 54 to the task controller 18 of the machine from the system controller 42, and a machine identification associated with the agricultural machine. In addition, the processor 66 further records GPS information and a time and date associated with each transfer of the operating file 54 between different components including transfer of the operating file onto the system controller 42 and from the system controller onto the task controller 18 of the agricultural machine. All of the chain of custody information acquired by the processor 66 can be stored in association with the operating file 54 together with various acquired performance information related to the execution of the agricultural operation by the agricultural machine in generating the reporting file 56 to be subsequently reported to the remote server 50.

The validation system controller 42 further includes a confidence processor in the form of a program which reads data from the operation data processor 62 to generate a confidence score representing a score that indicates that the actual agricultural prescription is being run from the task controller 18. Specifically, the confidence processor 68 calculates a percentage based confidence score that the as applied rates match the set points and target rates in the prescription file, that is the set of operating instructions defining the operating file 54. In instances where a single pass can include multiple products, for example seed and fertilizer, each layer could have a unique score which factors in location data, time and date information, target rate, setpoint, actual rate, etc. The number of deviations are tallied and a weighted average is compiled. Each file includes the given score for the data within the file and could also include a running score over the given field.

More particularly, the confidence processor 68 is arranged to obtain performance information relating to the set of operating instructions followed by the task controller to compare the set of operating instructions followed by the task controller to the set of operating instructions designated within the operating file. The confidence processor 68 then quantifies a confidence score which is representative of a similarity between the set of instructions followed by the task controller and one or more sets of operating instructions defined in the operating file 54. Rather than relying on measured outputs, the confidence processor is intended to generate a score which is representative of what the task controller intends the operating state of the agricultural machine to be.

The system controller 42 further includes a quality processor 70 in the form of a program which reads data from the operation data processor 62 to generate a quality score that is indicative of the quality of the execution of the agricultural operation when compared to the intended operating conditions prescribed by the operating file 54. A percentage difference of each deviation is calculated and each file includes the given score for the data within the file and could also include a running score over the given field. In this manner the quality processor 70 is arranged to obtain performance information relating to operating conditions of the operating elements 30 and/or 22 of the agricultural machines being in the proper active or inactive state as measured by the machine sensors 32 and 24 that are in communication with the communication bus of the agricultural machine. The processor 70 compares the sensed operating conditions to the prescribed conditions dictated by one or more sets of operating instructions of the operating file 54 and quantifies the quality score to be representative of a similarity between the sensed operating conditions and the prescribed conditions dictated by the prescription file 54. While the confidence processor 68 seeks to determine if the correct prescription file 54 was selected, the quality processor instead seeks to determine if the selected prescription file was accurately followed, for example was the correct rate applied through the operating elements or were the correct operating elements in the proper active or inactive state.

The memory 44 of the validation system controller is a memory area within the device that may comprise a non-volatile memory area or random-access memory from the device. It is the location where the chain of custody processor, the confidence processor, and the quality processor store their respective data.

The system controller 42 further includes a file generator 72 in the form of a program that combines the data from the operation data processor 62, the chain of custody processor 66, the confidence processor 68, and the quality processor 70 into a single file 56 for reporting back to the remote server or for transmission to any external device to which the validation system controller can report to. In instances where the system controller is configured to generate at least one score quantifying the comparison of the performance information acquired by the system to the set of prescribed operating instructions defined by the operating file 54 to determine a similarity or correspondence therebetween, these scores are included in the reporting file together with the chain of identifying information of each component the operating file 54 was transferred across to deliver the operating instructions to the task controller of the agricultural machine. Once the reporting file has been generated, the reporting file may initially be only stored on the system controller until a subsequent time when communication with an external apparatus to which the system reports to can be established. Once the reporting file has been generated, a file transmitter 74 in the form of a program on the validation system controller 42, receives the combined reporting file and queues the file for transmission to the cloud for storage, processing, reporting and alerting as may be desired.

In general, the validation system controller 42 acts as an intermediate device between a source of the operating file that forms part of a planned agricultural operation and the agricultural machine intended to execute the instructions of the operating file to perform the agricultural operation. The validation system controller 42 functions to receive the operating file 54 from an external device in which the operating file defines the set of operating instructions for the agricultural machine and communicates with the task controller of the agricultural machine so as to transfer the set of operating instructions to the agricultural machine. The validation system controller 42 subsequently acquires various performance information related to the execution of the set of operating instructions by the agricultural machine (for example location data, weather data, time and date information, operating conditions such as application rates, and any supplementary data provided by the operator) and compares the acquired performance information to the set of operating instructions defined in the operating file to determine a similarity and quantify the similarity therebetween.

A primary purpose of the validation system controller is to generate one or more scores that quantify the comparison of the acquired performance information to one or more sets of operating instructions defined in the operating file 54 to determine a similarity therebetween. Specifically, the scores quantify a similarity between the actual agricultural operations performed and the planned agricultural operation according to the prescription file 54.

Another primary purpose of the invention is to associate a chain of custody for tracing purposes with the prescription file 54. This includes a recording of the identification of each component across which the operating file 54 was communicated and the identification of any associated equipment used to carry out the agricultural operation.

The operating file of instructions 54 can further include instructions for the task controller to acquire specific performance information desired by the validation system controller 42 in its verification that the planned agricultural operation was followed. This may include instructions to the task controller to acquire specified sensed operating conditions of the various operating elements of the agricultural machine from designated machine sensors of the agricultural machine so that the validation system controller 42 is arranged to subsequently acquire and record those sensed operating conditions for subsequent analysis. In some instances where it is desired to have additional supplementary data included within the chain of custody file or within the reporting file, but such information is not readily available (for example the name of a given seeding variety, the name of a specific chemical, and the like), the operating file 54 may include instructions for the task controller 18 to prompt the user through the user interface 25 to enter the supplementary data associated with the agricultural operation such that the system controller 42 can subsequently associate the supplementary data input by the user as part of the reporting file 56 generated by the system for reporting to the remote server.

Various additional particulars with regard to the steps according to the method performed by the system controller of the system 10 according to the present invention will now be described in the following.

Initially, the Operating File of Instructions ("OFI") is created.

The system creates a unique identifier for the OFI and associates the unique identifier with the OFI for record keeping and analysis. The OFI may comprise the Unique Identifier or the Unique Identifier may be included as a separate file that is associated with the OFI file using software instructions within the Relay Device.

The Relay Device may, or may not be currently powered on. If the device is not currently powered on, upon the next power cycle, the Relay Device may receive the OFI file and unique identifier.

The OFI and the unique identifier are transmitted to the memory of the Relay Device. The Relay device may provide an electronic message indicating that it has received the OFI and the associated unique identifier. The Relay device acknowledgement message may comprise: Time stamp, and Unique ID of the relay device. GPS coordinates are obtained of the relay device at the time of receipt of the OFI and unique identifier. Communication network identifier information is obtained from the Operation Data Processor including Tractor bus information and ECU information. The transmitter of the OFI and unique identifier may save the relay device acknowledgment message for reporting and analysis purposes.

The Relay device then saves the acknowledgment message to its internal memory, comprising the Chain of Custody Processor.

The Relay device the saves the details of the OFI file in its internal memory, comprising the Chain of Custody Processor.

The relay device the extracts the contents of the OFI file and loads contents of the OFI file into its internal memory, comprising the Confidence Processor.

The relay device then extracts the contents of the OFI file and loads contents of the OFI file into its internal memory, comprising the Quality Processor.

The relay device then extracts the contents of the OFI file and loads contents of the OFI file into its internal memory, comprising the Operation Data Processor. If the OFI data includes instructions to record certain sensor values, and the Operation Data Processor is not previously instructed to record certain sensor values, then the Operation Data Processor may update its instructions to record sensor values included in the OFI data.

If the Relay device is powered on, the Operation Data Processor will read sensor values from at least one of the following: the communication networks to which the Relay Device is attached, a serial connection to a sensor or device that connects to sensors, or via wireless reception and/or transmission of sensor data. The Operation Data Processor begins transmitting sensor values to the Chain of Custody Processor, the Confidence Processor, and the Quality Processor.

The Relay Device then moves the OFI data to a memory location in the Relay Device that can be accessed by an external device via serial or wireless connection to the Relay Device. (a) If a processor or the central processing unit of the Relay Device receives an electronic message that the Relay Device has been physically connected to an external device via serial connection, the Chain of Custody Processor records and logs a Chain of Custody File that comprises: Timestamp, GPS of the Relay Device, ID of the Relay Device, OFI identifier, OFI contents and file description, Sensor data from the Operation Data Processor comprising ECU identification data, Available remaining memory of the memory location of the OFI data, and any available data that can be captured or detected from the external device itself— for example detecting the mount or circuit connection on a serial port by User confirmation via UT or MobileApp if available, SMS/Email, CanPlug HW. (b) The File Generator will perform at least one, two, three, or all of the following: (i) Copy data from the Chain of Custody File and include the Chain of Custody File data with other data recorded from the Operation Data Processor, the Confidence Processor, the Quality Processor, or both; (ii) Store the Chain of Custody File in the internal memory of the Relay Device; or (iii) Transmit the Chain of Custody File to an external system via wireless transmission or serial transmission.

The following is an overview of the confidence processor algorithm steps which focusses mostly on the CANBUS TC server side.

(a) Use Cases: Start last OFI received, Start older OFI, Resume last OFI monitoring, Resume older OFI monitoring, User feedback if UI available—could be a flag recorded all along, Multiple OFI processed in parallel, Identify OFI matches Read Sensor and determine which OFI is being processed, and Maintain scores for each OFI. This may further include: Match OFI requirements, Field, ECU, Target date, Example: wrong field: score 0, OFI requirement/target date/window, and Matching ECU (DDI, Type of Device Planter/Sprayer etc., Manufacturer) etc.

(b) Confidence Processor is maintaining a data model of a Confidence item. Each OFI monitored is represented by a unique item in the model.

(c) Detection of Activity includes: (i) Detect equipment and functionality available (ECU, Tractor, Monitor, RC, SC etc.); (ii) User activity on Relay Device User Interface (if available, UT, Mobile App, for example User selects a Planned Job which is referenced by an OFI); (iii) Identify OFI match (prune list of OFI), Match OFI requirements consisting at least of Field information (using GPS position), ECU information (using Sensor Processor), target date (using timestamp), Job reference (using cloud data and User setting on UI), [If OFI was never recorded before, create new item in the Confidence Processor model, If OFI was already recorded, resume Confidence Processor activity using existing item from the model]; and (iv) Sensor Processor Activity may also be detected such as Planned RC/SC server and RC/SC client all present and ready, and RC and SC activity detected (Rate and Section control DDIs activity).

(d) Monitoring Activity (continuous monitor after initial OFI selection) includes: (i) For each GPS point, check RC and SC setpoint values such as RC: is the Server CF desired value same than expected RX file, SC: is the Server desired value same than expected In/out Field, (ii) Compute Confidence scores such as Instant Confidence score, Average Confidence score (last XX seconds), Overall Confidence score, (iii) Record all computed data to Internal Storage (See then File Generator) including Timestamp, GPS of the Relay Device, ID of the Relay Device, OFI identifiers, OFI contents and file description, Available remaining memory of the memory location of the OFI data, Sensor data from the Operation Data Processor, comprising: ECU identification data (Server/Client side), All parameters used in the Confidence Processor algorithm, and Computed scores.

The following is an overview of the Quality Processor Algorithm, or deviation or sustainability and traceability processor algorithm. (I) The Confidence Processor provides guidance on what OFI is currently in use. (II) The quality Processor loads OFI in RAM memory. (III) Monitoring Activity and measure deviation includes: (i) For each GPS point, check Sensor value (Target and Actual Rate states), RC: is the Client actual value same than the given Server Target Rate, RC: Server Target Rate shall follow OFI Rx rate, SC: is the Client actual section states following the given Server target sections state, and SC: Server Target Section states shall match Field boundary; (ii) Compute Quality (deviation) scores including Instance Quality score, Average Quality score (last XX seconds), Overall Quality score (as quality score for the already covered area), and Overall Prescription/Field coverage; and (iii) Record all computed data to Internal Storage (similar to Confidence Processor).

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An agricultural operations validation system for use with one or more agricultural machines having a task controller in communication with a plurality of operating elements over one or more communication buses of the agricultural machine for controlling operation of the operating elements according to a set of operating instructions to execute one or more agricultural operations with the one or more agricultural machines, the system comprising:
    a system controller including a system processor and a memory storing programming instructions thereon that are arranged to be executed by the system processor whereby the system controller is configured to:
        receive an operating file from an external device in which the operating file defines said set of operating instructions for the one or more agricultural machines;
        communicate with the task controller of the one or more agricultural machines so as to transfer the set of operating instructions of the operating file to the task controller of the one or more agricultural machines;
        acquire performance information defining a performance of the one or more agricultural machines in execution of the set of operating instructions by the one or more agricultural machines;
        compare the performance information to the set of operating instructions defined in the operating file; and
        determine that the one or more agricultural operations have been executed according to the set of operating instructions if the performance information corresponds to any of the operating instructions of the operating file.

2. The system according to claim 1 wherein the system controller is further configured to generate at least one score quantifying the comparison of the performance information to the set of operating instructions defined in the operating file to determine if the performance information corresponds to the operating file.

3. The system according to claim 2 wherein the system controller is further configured to generate a reporting file that includes a unique identification associated with the operating file, a system identification associated with the system controller, a machine identification associated with the agricultural machine, and said at least one score.

4. The system according to claim 3 wherein the system controller is further configured to store the reporting file on the system controller for subsequent transfer to an external apparatus.

5. The system according to claim 3 wherein the system controller is further configured to report the reporting file to a remote server over a communications network.

6. An agricultural operations validation system for use with one or more agricultural machines having a task controller in communication with a plurality of operating elements over one or more communication buses of the agricultural machine for controlling operation of the operating elements according to a set of operating instructions to execute one or more agricultural operations with the one or more agricultural machines, the system comprising:
a system controller including a system processor and a memory storing programming instructions thereon that are arranged to be executed by the system processor whereby the system controller is configured to:
receive an operating file from an external device in which the operating file defines said set of operating instructions for the one or more agricultural machines;
communicate with the task controller of the one or more agricultural machines so as to transfer the set of operating instructions of the operating file to the task controller of the one or more agricultural machines;
acquire performance information related to execution of the set of operating instructions by the one or more agricultural machines; and
compare the performance information to the set of operating instructions defined in the operating file to determine if the performance information corresponds to any of the operating instructions of the operating file;
wherein the system controller further comprises a confidence processor arranged to (i) obtain performance information relating to the set of operating instructions follows by the task controller, (ii) compare the set of operating instructions followed by the task controller to the set of operating instructions of the operating file, and (iii) quantify a confidence score representative of a similarity between the set of operating instructions implemented by the agricultural machine under direction of the task controller and the set of operating instructions of the operating file.

7. An agricultural operations validation system for use with one or more agricultural machines having a task controller in communication with a plurality of operating elements over one or more communication buses of the agricultural machine for controlling operation of the operating elements according to a set of operating instructions to execute one or more agricultural operations with the one or more agricultural machines, the system comprising:
a system controller including a system processor and a memory storing programming instructions thereon that are arranged to be executed by the system processor whereby the system controller is configured to:
receive an operating file from an external device in which the operating file defines said set of operating instructions for the one or more agricultural machines;
communicate with the task controller of the one or more agricultural machines so as to transfer the set of operating instructions of the operating file to the task controller of the one or more agricultural machines;
acquire performance information related to execution of the set of operating instructions by the one or more agricultural machines; and
compare the performance information to the set of operating instructions defined in the operating file to determine if the performance information corresponds to any of the operating instructions of the operating file;
wherein the system controller further comprises a quality processor arranged to (i) obtain performance information relating to operating conditions of the operating elements of the agricultural machine obtained from machine sensors in communication with the communication bus of the agricultural machine, (ii) compare the operating conditions to prescribed conditions dictated by the set of operating instructions of the operating file, and (iii) quantify a quality score representative of a similarity between the operating conditions and the prescribed conditions dictated by the set of operating instructions of the operating file.

8. The system according to claim 1 wherein the system controller further comprises an operation data processor arranged to receive sensor data from operating condition sensors of the agricultural machine from the communication bus of the agricultural machine and convert the sensor data into a human readable data set stored on the system controller.

9. The system according to claim 1 wherein the system controller further comprises a chain of custody processor arranged to record: (i) a unique identification associated with the operating file, (ii) confirmation of a transfer of the operating file onto the system controller, (iii) a system identification associated with the system controller, and (iv) a machine identification associated with the agricultural machine.

10. The system according to claim 9 wherein the chain of custody processor of the system controller is further configured to record GPS information and a time and date associated with the transfer of the operating file onto the system controller.

11. The system according to claim 9 wherein the chain of custody processor of the system controller is further configured to record GPS information and a time and date associated with the transfer of the operating file onto the agricultural machine.

12. The system according to claim 1 wherein the performance information acquired by the system controller includes GPS information related to execution of the set of operating instructions by the agricultural machine.

13. The system according to claim 1 wherein the performance information acquired by the system controller includes time and date information related to execution of the set of operating instructions by the agricultural machine.

14. The system according to claim 1 wherein the performance information acquired by the system controller includes weather information related to execution of the set of operating instructions by the agricultural machine.

15. The system according to claim 14 wherein the weather information includes weather data acquired from a weather system of the agricultural machine.

16. The system according to claim 14 wherein the weather information includes weather data acquired over a wireless communication network from a remote weather system.

17. The system according to claim 1 wherein the system controller comprises a portable relay device that is readily separable from the agricultural machine.

18. The system according to claim 17 wherein the portable relay device includes a transceiver arranged to receive the operating file from said external device over a wireless communications network.

19. The system according to claim 17 wherein the portable relay device includes a unique system identification stored on the system controller together with the operating file that unique identifies the portable relay device.

20. The system according to claim 17 wherein the portable relay device includes an integral GPS device arranged to acquire GPS information related to a position of the portable relay device.

21. The system according to claim 1 wherein the agricultural machine includes machine sensors arranged to sense operating conditions of the operating elements of the agricultural machine, and wherein the system controller is arranged to communicate with the machine sensors through a communication channel independent of a communication channel between the system controller and the task controller.

22. The system according to claim 1 wherein the operating file on the system controller includes task controller instructions arranged to instruct the task controller to acquire sensed operating conditions of the operating elements of the agricultural machine from machine sensors of the agricultural machine and the system controller is arranged to acquire and record said sensed operating conditions from the task controller.

23. The system according to claim 1 wherein the operating file on the system controller includes task controller instructions arranged to prompt a user of the agricultural machine for supplementary data related to the one or more agricultural operations, and wherein the system controller is further configured to store the supplementary data input by the user of the agricultural machine onto the system controller in association with the operating file.

24. A method of validating an agricultural operation has been executed according to a set of operating instructions, the method comprising:
providing an agricultural machine having a task controller in communication with a plurality of operating elements over a communication bus of the agricultural machine for controlling operation of the operating elements according to a set of operating instructions to execute the agricultural operation with the agricultural machine;
using a validation system controller to transfer an operating file from an external device to the task controller of the agricultural machine, in which the operating file defines said set of operating instructions for the agricultural machine;
using the validation system controller to acquire performance information defining a performance of the one or more agricultural machines in execution of the set of operating instructions by the agricultural machine; and
comparing the performance information to the set of operating instructions defined in the operating file to determine that the agricultural operation has been executed according to the set of the operating instructions if the performance information corresponds to any of the operating instructions of the operating file.

* * * * *